US010915241B2

(12) United States Patent
Choi et al.

(10) Patent No.: US 10,915,241 B2
(45) Date of Patent: Feb. 9, 2021

(54) COMMUNICATION DEVICE WITH ID INPUT METHOD WHICH CONFORMS TO POSITIONAL NOTATION OF NUMERAL SYSTEM

(71) Applicant: TINYPOWERS CO., LTD., Anyang-si (KR)

(72) Inventors: Chang Joon Choi, Anyang-si (KR); Jaeboo Choi, Anyang-si (KR)

(73) Assignee: TINYPOWERS CO., LTD., Anyang-si (KR)

( * ) Notice: Subject to any disclaimer, the term of this patent is extended or adjusted under 35 U.S.C. 154(b) by 186 days.

(21) Appl. No.: 16/099,206

(22) PCT Filed: May 17, 2017

(86) PCT No.: PCT/KR2017/005120
§ 371 (c)(1),
(2) Date: Nov. 6, 2018

(87) PCT Pub. No.: WO2017/204485
PCT Pub. Date: Nov. 30, 2017

(65) Prior Publication Data
US 2020/0310614 A1 Oct. 1, 2020

(30) Foreign Application Priority Data

May 25, 2016 (KR) .................. 10-2016-0064261
May 16, 2017 (KR) .................. 10-2017-0060414

(51) Int. Cl.
*G06F 3/0488* (2013.01)
*G06F 3/147* (2006.01)

(52) U.S. Cl.
CPC ............ *G06F 3/0488* (2013.01); *G06F 3/147* (2013.01)

(58) Field of Classification Search
CPC ............................. G06F 3/0488; G06F 3/137
See application file for complete search history.

(56) References Cited

U.S. PATENT DOCUMENTS

2016/0247486 A1* 8/2016 Chakraborty ....... G06F 3/04842

FOREIGN PATENT DOCUMENTS

JP 2011-095840 A 5/2011
JP 2013-196657 A 9/2013
(Continued)

OTHER PUBLICATIONS

Search Report, dated Aug. 9, 2017, for International Application No. PCT/KR2017/005120.
(Continued)

*Primary Examiner* — Lisa S Landis
(74) *Attorney, Agent, or Firm* — LRK Patent Law Firm

(57) ABSTRACT

The present invention relates to a transmitting/receiving device for easily inputting a unique identification ID for communications by using one or two digit input units, which refers to a hand-operated switch, a sensing unit of a touch pad or a touch screen, in such a manner that each digit of ID in a decimal/hexadecimal positional notation is inputted to an input port of a microcontroller by repeating toggle operation of the digit input unit n times to input a digit value n as decimal/hexadecimal value, and position of the digit to be inputted is changed by means of that for a predetermined time the digit input unit is operated or not operated, and a microcontroller or the like calculates an communication device ID by means of the combination of inputted digits and position changes according to principles of the positional notation.

1 Claim, 3 Drawing Sheets

(56) References Cited

FOREIGN PATENT DOCUMENTS

| | | |
|---|---|---|
| JP | 2015-127909 A | 7/2015 |
| KR | 10-2008-0062602 A | 7/2008 |
| KR | 10-2011-0076234 A | 7/2011 |

OTHER PUBLICATIONS

Written Opinion, dated Aug. 9, 2017, for International Application No. PCT/KR2017/005120.

* cited by examiner

A: Is there a pre-installed ID?
B: Is switch "On" detected?
C: Is switch "On" duration time equal to or longer than "ID input start time T1"?

D: Is switch "On" detected"?
E: Is switch "Off" detected"?
F: Is switch "Off" duration time equal to or longer than "position change input time T2"?
G: Is switch "Off" duration time equal to or longer than "procedure termination input time T3"?

H: The coefficient digit to be displayed is that of weight value 1 or not?

COMMUNICATION DEVICE WITH ID INPUT METHOD WHICH CONFORMS TO POSITIONAL NOTATION OF NUMERAL SYSTEM

CROSS-REFERENCE TO RELATED APPLICATIONS

The present application is a U.S. National Phase entry from International Application No. PCT/KR2017/005120, filed May 17, 2017, which claims priority to Korean Patent Application Nos. 10-2016-0064261, filed May 25, 2016, and 10-2017-0060414, filed May 16, 2017, the disclosure of which is incorporated by reference herein in its entirety.

BACKGROUND

1. Technical Field

When a plurality of devices is connected to each other by communication, each communication transmitting/receiving device has a unique device identification (ID) code so that the other device may identify itself, and a microcontroller of each communication device selects only the information matched with its own ID from the information entering into a communication line using the ID to perform a communication. The ID code is also called an address. The present invention relates to a communication device to which a method of simply inputting a unique identification ID to a communication device or a device controlled by communication by using a button or a switch according to the principle of positional notation.

2. Description of Related Art

When multiple communication devices are connected as multi-drop method in RS-485 communication and the like, the corresponding ID code of a device to be communicated is transmitted together with communication data. Generally, each communication device analyzes a communication packet and takes only packet data of the same ID as its own for selected target communication.

Wireless communication such as ZigBee or Z-wave also determines whether the data to be transmitted to each communication device has come to itself in the same manner. In case of DALI (Digital Addressable Lighting Interface) or DMX512, which control a plurality of lightings by wired communication, there is a means for inputting an ID corresponding to each address, and the ID is inputted mainly into a DIP (dual inline package) switch or with a switch having a dedicated display device.

In ZigBee, Z-Wave, and other wired/wireless communication technologies, the ID may be called a communication ID, and in lighting control devices such as DMX512 and DALI controlled by wired communication, the ID may be referred to as a control target ID. However, eventually, since the ID is used for identifying a receiving unit in the communication process, hereinafter, the IDs are all called the communication ID. Since devices controlled in the same communication as lighting control devices such as DMX512 and DALI include communication devices as a part of the configuration, there is no problem even if an actual control target ID is a communication ID.

The most common method for receiving the communication ID or address is to use a DIP switch in which a plurality of element switches is assembled into one element. Each element switch corresponds to a binary digit and inputted ID corresponds to a combination of On/Off states of element switches and then microcontroller receives the state of the dip switch to use it as a communication ID.

There is also a digital rotary switch which may perform the same function as the DIP switch by assembling a plurality of toggle switches as a modification, and getting input value related to a communication ID corresponding to the degree of rotation as the ID.

When using a dedicated device for the purpose of ID input, there is a method of receiving and using ID value acquired from the dedicated device via a wired/wireless communication means such as UART, SPI, I2C, USB, Wi-Fi, Bluetooth, ZigBee or various other means by microcontrollers.

An input means of the dedicated device for the separate ID input may be a DIP switch, a combination of a plurality of toggle switches, a rotary switch, a keypad to which a decimal or hexadecimal number is mapped, or a touch panel.

In addition, the input means may input a unique setting value such as an operation mode value which is not ID or Address according to devices by using other digits of decimal or hexadecimal number, and may also include an LED, an LCD, and other display devices which display a current input state or value.

The input means may include UP and DOWN switches and receives the digit value with the method of increasing or decreasing the digit value displayed at 7-segment display device according to pressing action. The input means may be implemented in the communication device itself or the device itself to be controlled in communication, or may receive values inputted from devices that are connected in such a way.

There is a method of inputting input values from a program running on an information device such as a PC, a smart phone, or a smart pad and connecting the result to a USB, a UART or other means capable of communicating with the microcontroller, and also inputting the ID by communicating with the microcontroller using a wireless communication means such as Wi-Fi, IoT, ZigBee, Bluetooth, or the like.

However, these various input devices are relatively complicated and expensive, and in some cases, maintenance is difficult due to the problem of conversion to binary numbers. Since the DIP switch has a plurality of element switches, power consumption is large due to each bias current.

To increase or decrease the digit value with both the up and down switches, it is necessary to have at least two switches and a 7-segment to show the increased/decreased value, and thus it is complicated.

If a switch that changes the digit position for inputting each digit value corresponding to the digit position is used in the case of using a plurality of switches according to the length of the ID, there is a problem of space occupied in a very small-sized communication device and there is a problem that the microcontroller's input ports are limited in the case of receiving all the plurality of switch values.

SUMMARY OF THE INVENTION

As a method of inputting a unique identification ID for identifying an existing communication device or a device to be controlled by a communication, there is a method of receiving an input of a DIP switch, a rotary switch, a plurality of toggle switches by an input port of a microcontroller, receiving the input using a 7-Segment display device and a switch of changing a digit such as up and down, or receiving the input by a communication port of the microcontroller using a communication function with a dedicated ID input device, a PC, a smart phone, a tablet, a smart pad, or a touch pad type input device.

The object of the present invention is to provide a low-power and economic method capable of creating various designs due to the smaller occupying space than the designs of conventional methods in inputting communication ID into the communication device or into the apparatus controlled by the communication device.

Hereinafter, the term "device" may refer to a communication device or some circuit components of a device controlled by communication, or may be an external module connected thereto. A preferred embodiment is most preferably in the form in which one switch and one LED is connected to the ports of a microcontroller playing a main role in a communication device or a device controlled by a communication device. Therefore, the expression "device" should be construed not only as a communication device or a device controlled by a communication, but also as a part of the configuration of such a device.

Since the main function of a device controlled by a communication is usually performed by a microcontroller, and since the microcontroller usually includes both communication function block and a control function, hereinafter, the term communication device includes a device controlled by a communication.

The present invention uses a means for inputting with a finger. The means is a push switch pressed by a finger, and it is a touch sensing input means on a touch sensor or a touch screen in a communication device requiring the touch sensor or the touch screen. This means is referred to as a "digit input means."

One "digit input means" is mainly used, but a separate another "digit input means" may be used for other purposes. For example, in case of inputting a signal meaning that from now on it is ID inputting process or a signal meaning that the device should display the inputted ID, it may be served by the second "digit input means", or it also may be served by the only one "digit input means" together with the actual ID value inputting process.

The switch signal or the touch signal of the "digit input means" may be used as an input of another circuit, and the circuit processes the information by receiving the push or touch state. Hereinafter, a case of pressing the switch or performing the touch is defined as "ON" of the "digit input means" and a case of releasing the switch or releasing the touch is defined as "OFF" of the "digit input means."

The "digit input means" is usually connected to an input port of the microcontroller to allow the microcontroller to recognize "ON"/"OFF" and count the number of toggles. The time during which the switch is pressed or released until the switch status toggles, or the time elapsed while the switch is being pressed or released is measured and used as the main input information. To this end, a circuit or microcontroller connected to the "digit input means" is provided with a timer. The timer is used to determine the time at which the input state value of the previous "digit input means" is changed, and the circuit or the microcontroller may determine that the input state of the "digit input means" is not changed but maintained for a predetermined time.

The user can input numbers by repeating toggle changes of the "digit input means" within a predetermined time, and input that the digit of the ID has been changed by holding an idle period for a certain time or maintaining a pressed state for a predetermined time. In this way, it is necessary to maintain the state over a predetermined time, and a method of notifying an inputting person that the predetermined time has passed is required.

It is possible to notify the elapsed time by using an LED emission state or a display of a visual panel or screen, or a beep sound of a sound generator. This means is defined as an "information display unit." The "information display unit" may also be used as a means of displaying what the input ID is, and, for example, displays the digit of the ID value at the each position of positional notation by the number of times of repetition of the LED light blinking, and displays the the digit position change by not toggling or displaying the distinguished display for a predetermined time.

When the communication device itself has a screen of an LCD, an OLED, or other visual display devices such as a touch screen or a pad, digit value at each position may be displayed as a decimal or hexadecimal number on the screen instead of the number of times of blinking repetition.

As a result of inputting a digit of 0 to 9 in a certain digit position of the ID as the number of times of repetition of changing state of the "digit input means" and inputting the digit input position change to next position as a pause for a certain period of time (displaying the fact as the LED over time), in the circuit or the microcontroller to which the "digit input means" is connected, the process of calculating the ID happens by using the idle states which means the digit position change and each toggle count between the idle states which means digit at each position. In the case of using the microcontroller, the ID is calculated as an operation function of the microcontroller.

The ID may be displayed in hexadecimal rather than decimal, and may also be input according to each hexadecimal digit. In this case, each digit is not 0 to 9 but 0x0 to 0xF.

The calculated ID is stored in an SRAM, an EEPROM, a flash memory, or other non-volatile storage means equipped with a battery or not, and read again and used at initialization process even after the power is turned off. The non-volatile storage space inside the microcontroller can be utilized or the non-volatile storage space separately connected to the microcontroller may be used.

Advantageous Effects

An existing method of inputting an identification ID to a communication device uses various input devices such as a DIP switch in which a plurality of element switches are assembled, a rotary switch in which multiple toggle element switches equipped, a dedicated ID input device with up/down digit increase/decrease switches and 7-segment display device, a dedicated ID input device which is connected to PC, a smart phone, a smart pad, or a touch pad type input device by a communication for ID inputting. However, it is relatively expensive and there is a problem of the cost and a space occupied by the elements. The present invention can solve these problems in cost and space because the communication ID can be input by one switch and one LED only.

When a binary ID is input according to each setting of the element switches, the DIP switch has the drawback that since a lot of element switches for each bit are provided all at once, and it takes up a lot space, and a large amount of power consumption is required depending on the number of element switches.

The present invention has a great advantage in that the value of the ID is input using one or two push switches, preferably a tactile switch (tact switch) which can easily recognize a pressing situation as tactile (clicking or touch sensing), and cost is low, the occupied space is small, and thus the degree of freedom in the product design is high, the power consumption is small, and the size of the communication device is small.

Even in a device having no input ID display device, because the ID may be displayed using the blinking with the LED, for the display of the input ID, the present invention has the same advantages and effects.

DETAILED DESCRIPTION OF EMBODIMENTS

Figure 1:
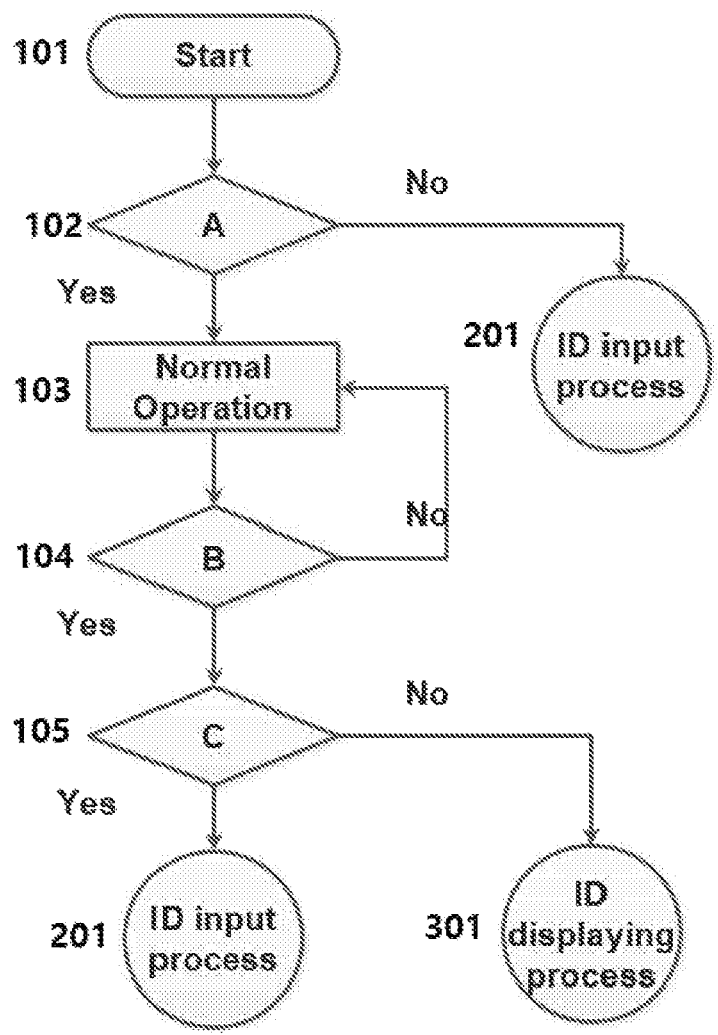
FIG. 1 is a flowchart showing an "ID input start" process or an input "ID display process" when a "digit input means" is a switch in the present invention.
Figure 2:
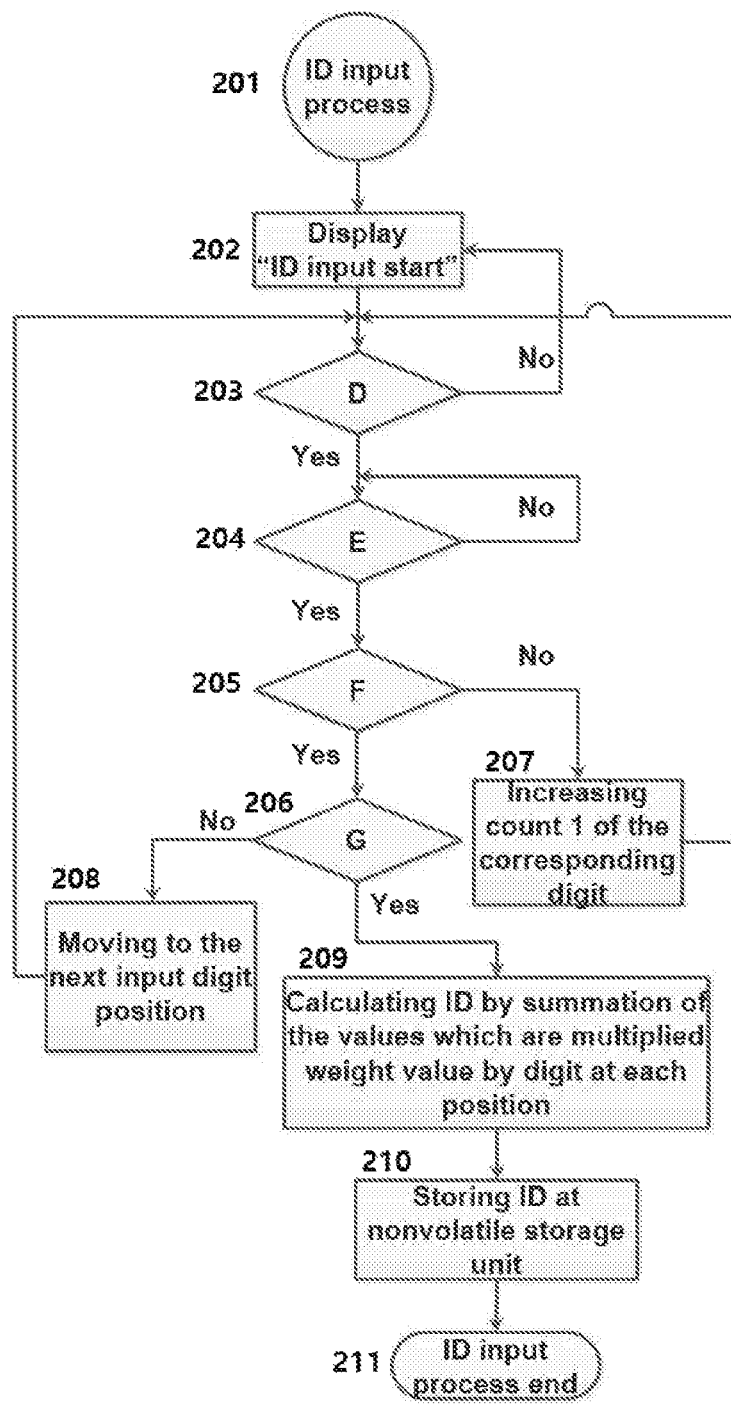
FIG. 2 is a flowchart showing an "ID input process" when a "digit input means" is a switch in the present invention.
Figure 3:
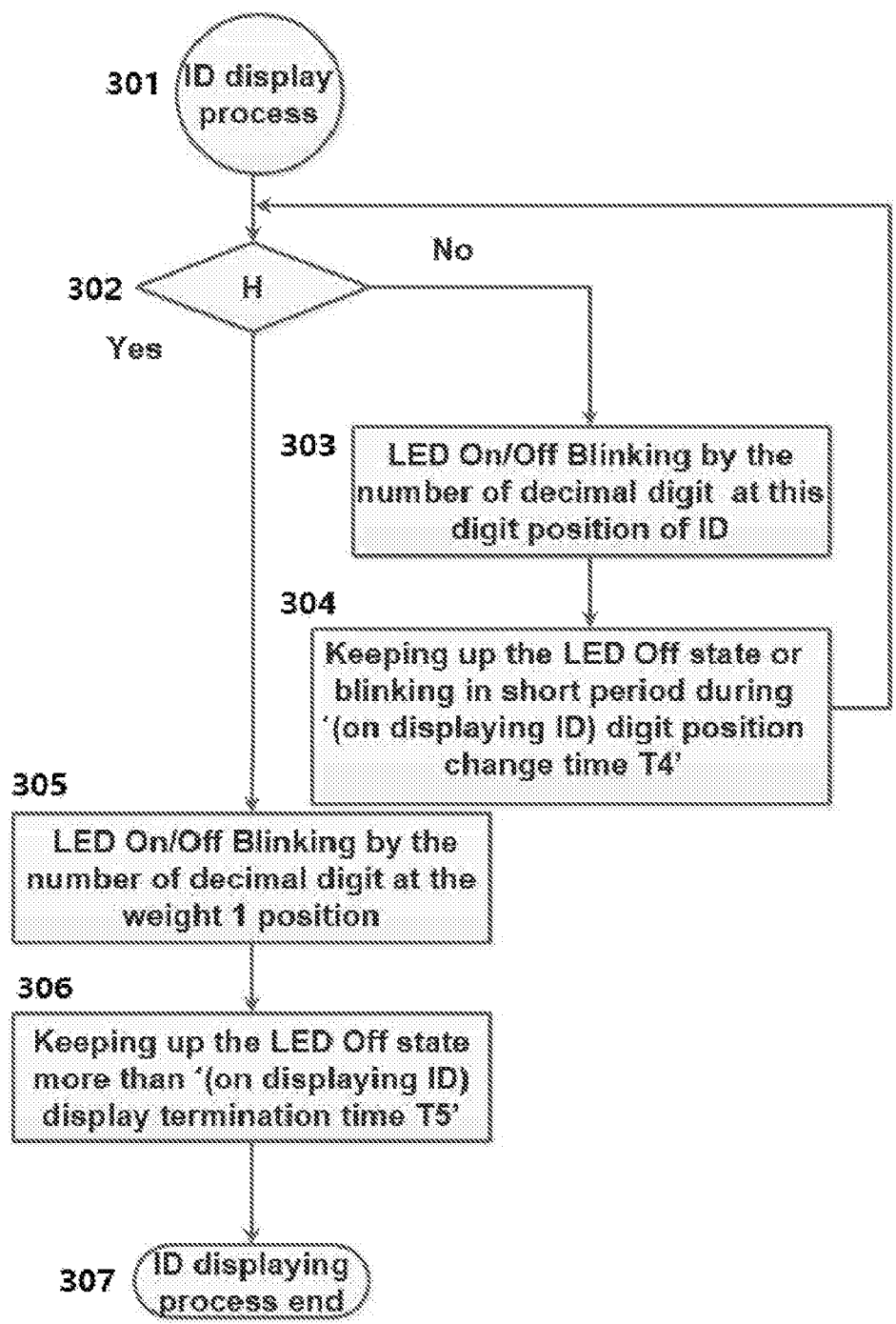
FIG. 3 is a flowchart showing a process of displaying an input ID when the "digit input means" is a switch and an "information display unit" is an LED in the present invention.

It is preferable that the present invention is applied to a communication module of a controller for performing various remote controls including illumination, motor actuation, or air conditioning, or to a communication module of a sensor unit that acquires various pieces of information to notify information by remote communication.

Most preferably, it is simple and profitable to connect one LED for blinking and one switch pressed by a hand to the input ports of the microcontroller performing a communication function and to use a built-in timer of the microcontroller.

By using of one LED, one switch, a timer and an arithmetic unit and a storage unit of one microcontroller, digit values of ID at each digit position is inputted as the count of switch pressing, and position change of digit is inputted when the switch input is not performed for the predetermined time and notifying it with LED, and the former two processes are repeated and the microcontroller finds out the each digit values of the digit positions with switch input and calculates the ID with them and store it at the storage unit.

A function to display the currently inputted ID value is performed in response to the short press of the switch, and notifying the change of the digit position of ID is done by making the LED to be OFF for a certain time, and the digit value at each digit position of ID is notified as the number of times of blinking. It is preferable to use the method in combination as a method of confirming the input ID.

Also, if a new ID is to be input and updated, the present invention allows it in a form of starting the "ID input process" 201 by pressing the switch for a predetermined time and determining the press by the microcontroller.

An "ID input process" 201 is divided into two processes, "position change input" 205, 206, 208 and "digit input" 205, 207, wherein the "position change input" 205, 206, 208 is inputting the meaning that device should find out the digit position and the weight value among the one, ten, hundred, thousand, or ten thousand, etc. at the digit position and start next "digit input" 205, 207 process. "Digit input" 205, 207 is inputting the digit value among 0, 1, 2, 3, 4, 5, 6, 7, 8 and 9 at each digit position if the ID is a decimal number, and depending on the length of the ID, the "digit input" 205, 207 and "position change input" 205, 206, 208 are repeated. According to the repetition count of two processes, two digit-positions, three digit-positions, four digit-positions, multi digit-positions ID can be inputted. When using a hexadecimal system, the coefficient digit for each weight is one of the 0, 1, 2, 3, 4, 5, 6, 7, 8, 9, 10, 11, 12, 13, 14, and 15, and ID has the weights 16, the square of 16, and the cube of 16, etc.

If a timer of the microcontroller recognizes the fact that the switch is pressed for an "ID input start time T1" 105 during a normal operation 103, the input step of "ID input process" 201 begins.

The "digit input" 205, 207 and the "position change input" 205, 206, 208 are repeated according to the digit position and the decimal or hexadecimal digit of the ID at the digit position on being inputted in each decimal or hexadecimal method. The "digit input" 205, 207 means uses a "digit input means," and the "position change input" 205, 206, 208 is performed over a certain period of time while the "digit input means" is in an "OFF" state.

Since an electric device cannot recognize how many digit positions an ID has when the input starts, the length of the ID to be input is determined according to how many times the "position change input" 205, 206, 208 has performed. The meaning that there is no more digit position to be input is recognized only when an input meaning that the final input has terminated, that is, a "procedure termination input" 206, 209 is input, and then the ID input is really terminated and the length and the all digits of ID value of the final ID are determined. A means of the "procedure termination input" 206, 209 is similar to the "digit change input," 205, 206, 208 and uses a method of extending the time for an "ON" or "OFF" of the "digit input means."

After the digit coefficient of weight 1 is inputted, it is necessary to perform the "procedure termination input" 206, 209 instead of the "position change input" 205, 206, 208 to inform the microcontroller or the like that the "ID input process" 201 is completed. When the "digit input means" is maintained in "OFF" or "ON" for a "procedure termination input time T3" in the process 206, 209, which is longer than the "position change input time T2" in the process 205, 206, 208, the timer confirms the "OFF" or "ON" and determines that the ID input and ID acquisition process is terminated.

The coefficient digit input may be advanced from the digit of highest weight to the digit of the weight value 1 or the coefficient digit input may be performed in a reverse direction from the digit of weight value 1 in the reverse direction. When the ID is calculated in the final microcontroller or the like, the ID is calculated by summation of the weight value which is the power of 10 or the power of 16 multiplied by each coefficient digit at the digit position in consideration of a predetermined direction 209.

If the "digit input means" is the switch and the LED is used, an example of inputting the ID decimal of "375" to an electric device using the microcontroller proceeds as follows.

The "ID input start" 101, the "ID input process" 201, the "digit input" 205, 207 and the "position change input" 205, 206, 208 processes, and the "procedure termination input" 206, 209 are performed in sequence. In the input of ID 375, the "digit input" 205, 207 may be performed in reverse order of 5, 7, and 3 from the digit position of weight 1 or vice versa.

Each "digit input" 205, 207 is done by repeating operations ("OFF" after "ON") of pressing and releasing the switch according to the digit value of each digit position. When the digit is 3, the operation of pressing and releasing the switch is repeated three times. At this time, in the "OFF" time, the "ON" of the subsequent toggle needs to start within a time shorter than the "position change input time T2" in the process 205, 207. Otherwise, it is judged to be the "position change input" 205, 206, 208 instead of a toggle for increasing the digit value.

When the digit value to be inputted is 0, the timer of the microcontroller should recognize the fact that the switch is not pressed during the "position change input time T2" in the process 205, 206, 208 or continues to be pressed during the "position change input time T2" in the process 205, 206, 208, then the process proceeds to the input of digit at the next digit position.

If the LED displays the blinking or "ON" condition as the meaning that the "position change input time T2" in the process 205, 206, 208 has passed, that is, the digit has been changed and input of digit of the next digit position should start, it is convenient to start the digit input of the next digit position with reference to the condition.

Next, to input a digit 7 of next digit position, the "ON"/"OFF" toggle is repeated by pressing and releasing the switch seven times, and then "digit input means" should be in the "OFF" state for "position change input time T2" in the process 205, 206, 208 so the "position change input" should be performed.

When it is noticed that the "position change input time T2" in the process 205, 206, 208 has passed as the "ON" or blinking of the LED, the five times-repeated switch "ON"/"OFF" toggle corresponding to the digit 5 is to be inputted again. When a "digit input" 205, 207 of 3, a "position change input" 205, 206, 208, a "digit input" 205, 207 of 7, a "position change input" 205, 206, 208, and a "digit input" 205, 207 of 5 should be finished in sequence, the digit position of weight value 1 is the last input that the input process should be terminated instead of the "position change input" 205, 206, 208 and the timer determines that the switch is not pressed but left in the "OFF" state for a "procedure termination input time T3" in the process 206, 209 or continuously pressed during the "procedure termination input time T3" in the process 206, 209, the "ID input process" 201 is finished 211.

The "arithmetic unit" adds the values which are the weight values in the form of powers of 10 according to how many "position change input" 205, 206, 208 processes happened before multiplied by digit value at each digit position according to "digit input" 205, 207 is performed by considering the input 3, 7, and 5. It multiplies a first input coefficient digit 3 by the weight value 100 which is the value of 10 multiplied by the count of ["position change input", 2] times at that digit position, multiplies a second input coefficient digit by the weight value 10 which is the value of 10 multiplied by the count of [the counted number of "position change input"-1, 1] times, and multiplies a third input coefficient digit 5 by the weight value 1 which is the value of 10 multiplied by the count of [the number of "position change input"-2, 0] times and add them. That is, 3, 7, and 5 of 375 are multiplied by 100, 10, and 1, respectively, and then the ID is calculated as 3×100+7×10+5×1=375, stored in a "non-volatile storage unit" 210 and used as the ID. The "arithmetic unit" may be embedded in the microcontroller.

If the coefficient digit at the digit position to be inputted is 0, either a method of repeating the toggle 10 times or a method of not inputting the toggle for a predetermined time (0 times input) is selected. If the ID is used in the hexadecimal system, the coefficient digit of 0 uses a method of inputting a toggle 16 times or a method of not inputting the toggle for a predetermined time (0 times input).

In the input process, a time interval is set to T2<T3 to confirm whether the "position change input time T2" in the process 205 or the "procedure termination input time T3" in the process 206 has passed. The "digit input" 205, 207 needs to be toggled while the "digit input means" is "OFF" for the time T of T<T2, and in the "position change input" 205, 206, 208, the "digit input means" needs to be continuously "OFF" or "ON" for the time T of T2<T<T3. In the case of terminating the input, if the "digit input means" continues for a time T of T3<T, it can be seen that the timer determines this and the input is completed.

Since an inputting person may not exactly know whether the "position change input time T2" in the process 205 or the "procedure termination input time T3" in the process 206 has passed, "ON" or blinking of the LED may be used as a means of notifying that the time has passed. An electric device including a touch screen or other screen display means may directly inform numbers through such a screen display device. If the system has a buzzer or a speaker, a short beep sound may be used. As such, the LED, the screen display device, or a sound generator will be referred to as an "information display unit."

The "information display unit" is used as an indicator to input the coefficient digit of the next digit position since the "position change input time T2" in the process 205 has passed in the input process in conjunction with the operation of the timer of the connected circuit or the microcontroller. The "information display unit" may be used to indicate that the input procedure is end even up to the "procedure termination input time T3" in the process 206.

The "information display unit" can also be used to display the ID that has already been inputted and stored 301. Each digit of inputted and stored ID is displayed by the means of LED blinking 303 or by the displaying of other kinds of "information display units" (when the digit to display is 0, the LED or a sound display means does not perform any action for a predetermined time or operates the blinking of 10 times in decimal system or 16 times in the hexadecimal system). The indication of that the notification of the digit at the digit position has been finished and then a digit at the next digit position will be displayed 304 uses a method in which the LED or the sound display means does not operate ("OFF") for a "(on displaying ID) digit position change time T4". When the "information display unit" capable of displaying information on a screen is used, it is also possible to display a digit value with a special display or moving action to next digit position on the screen.

When displaying the ID, an indication meaning that the "ID displaying process" has completed so the user can calculate ID then because there is no more information to display, it may be notified to the user by means of not operating any "information display unit" for a "(on displaying ID) display termination time T5", by means of maintaining the LED light emission or by means of other indication method of the "information display unit" 306. When using the screen as the "information display unit," it is more convenient to display the ID of the decimal value directly on the screen as the digits of ID.

The input of the intention to display the ID 105, 301 or the input of the intention to start inputting a new ID 105, 201 may be performed by using the "digit input means" which is usually used for inputting the digits, or by using the "second digit input means" as a separate role from the digit input. It is possible to distinguish the operation of the "digit input means" between "ID input process" 201 and displaying the ID 301 or starting the ID input by whether the "digit input means" is operated after or before the start of input.

However, since the input of the intention to display the ID 105, 301 and the input of the intention to newly input the ID 105, 201 are to be distinguished from each other, in the process where the electric device normally operates, that is, before the input initiation starts, when the input of the "first digit input means" or the "second digit input means" is maintained as "ON" for a time shorter than the "ID input start time T1" 105, it is determined as the intention to display the ID 105, 301 and when the "first digit input means" or the "second digit input means" is maintained for a time "ID input start time T1" (the switch is maintained to be pressed) in the process of 105, 201, it is determined as the input of the intention that a procedure of inputting a new ID value should start, and then the inputting new ID procedure is performed.

A procedure time for clearly distinguishing the digit position on the process of ID display is required 304, which is "(on displaying ID) digit position change time T4", and for notifying the fact that the ID displaying process has completed 306, "(on displaying ID) display termination time T5" is used.

Since it is difficult for the inputting person to determine whether each time of the "ID input start time T1," the "position change input time T2," the "procedure termination input time T3," the "(on displaying ID) digit position change time T4" or the "(on displaying ID) display termination time T5" has elapsed, the timer may determine it and inform the inputting person that the time has elapsed by means of "ON" or the blinking of the "information display unit" (in the case of the LED) at each procedure, and the inputting person performs the "ID input process" by referring to this information. In the case of a screen of an LCD, an OLED, or other visual display devices such as a touch screen or a pad instead of the LED, each digit value may be displayed as a decimal or hexadecimal digit letter on the screen.

When receiving an input to display the ID if the initial ID is not inputted, it is convenient to display a special indication with the "information display unit". When the LED is used, blinking at a very short cycle over a predetermined time can be used. The blinking at a very short cycle may also be used for blinking to inform that the "ID input process" is started. When the initial ID is not inputted and the input of requesting the ID display is received, it is automatically switched to the "ID input start" 201, and it is indicated by short-cycle LED blinking to display the fact that the ID input process has started.

As such, when the input of digit from 0 to 9 in a decimal system or digit from 0x0 to 0xF in a hexadecimal system at each digit position, and a "position change input" are used alternately, the "arithmetic unit" of the connected circuit or the microcontroller can calculate the ID value 209 as decimal or hexadecimal number. The calculated ID value is stored in the "non-volatile storage unit", in an internal non-volatile storage space of the microcontroller or in an external storage device 210. If the microcontroller is newly initialized, the value is read from the storage unit and used as the ID.

INDUSTRIAL APPLICABILITY

There are control demands and sensor network demands for a variety of uses such as lighting, motor rotation, air conditioning, humidity, temperature, security, etc. in various places such as homes, public buildings, or public facilities, and the central management station or a manager needs to remotely control various control terminals distributed or to perform a function of collecting necessary sensor information from the sensors.

The distributed controlled objects or sensors have a communication function block to control the communication or to collect the sensing information. In order to select and control the objects or to acquire the sensor information selectively among the various objects, the possible means is matching a unique identification ID to identify each control object or sensor and including the ID in the communication packet so as to respond only to the information or control value of the packet value corresponding to its own ID and additionally using the position information which the sensor has sensed. Since the control object and the sensor all have a communication function block to be connected remotely, it is understood that the sensor or the control object ID is actually the same as the communication ID. Various wireless communications such as ZigBee, and Z-Wave, or various wired control communications such as RS-485, DALI, and DMX512 are the same cases.

The present invention can be utilized industrially because it is required to input an ID actually for identifying each control terminal or sensor installed and for controlling or sensing remotely in various business field of the industry, and the present invention improves the drawbacks of the existing ID input method.

The invention claimed is:

1. A method for communication transmitting/receiving device to process a unique identification ID for communication according to a positional notation,
   wherein the device performs the identification ID acquisition process comprising;
   starting an ID input process of the device when a timer determines that a digit input unit or a second digit input unit that is a switch, a touch sensor or a touch screen is turned on for an ID input start time T1;
   performing a digit input to input and find out a digit value at a specified digit position of the communication ID in decimal or hexadecimal base notation, wherein the digit value at the position is n when the toggle of the ON/OFF input of the digit input unit is performed n times;
   determining it as a position change input when the timer determines that the ON or OFF duration of the digit input unit is maintained for a position change input time T2;
   repeating the digit input and the position change input processes according to the length of the communication ID of the device in decimal or hexadecimal base system;
   terminating ID input process when the timer determines that the digit input unit is maintained in ON or OFF for a procedure termination input time T3;
   calculating a communication ID of the device by summation of the values obtained through multiplying the weight value (power of 10 or the power of 16) by each coefficient digit value, wherein the power is from the count how many position change input process happened before and the coefficient digit value is from the count how many toggles of ON/OFF input in digit input process happened at each digit position;
   storing the calculated communication ID in a non-volatile storage unit; and
   performing a function of notifying that the ID input start time T1/the position change input time T2 is elapsed by means of lighting of the LED, or sound generation of an information display unit when the timer determines that a state maintaining time of ON or OFF of the digit input unit until the ID input start time T1/the position change input time T2, and
   wherein the device performs the stored identification ID displaying process comprising;

displaying a digit value of the stored ID at each digit position by means of the LED blinking or generation of the sound as many times as the decimal or hexadecimal digit value of the stored identification ID of the communication device at the digit position, or showing number letters of the stored ID on the screen display device, when the timer determines the ON toggle time of the digit input unit or the second digit input unit shorter than the ID input start time T1;

notifying the position change of the digit to be displayed by means of maintaining OFF state of the LED or keeping the generation of the sound stopped for the (on displaying the stored ID) digit position change time T4, or by changing position of digit displayed on the screen display device, between the procedures of displaying each digit value; and repeating the displaying of each digit value and the notifying of position change according to the length of the stored identification ID as decimal or hexadecimal number.

* * * * *